United States Patent
Mahone, Jr.

[15] 3,693,278
[45] Sept. 26, 1972

[54] ILLUMINATED FISHING BOBBER

[72] Inventor: Asie Mahone, Jr., 1309 North 44th St., Kansas City, Kans. 66104

[22] Filed: April 23, 1971

[21] Appl. No.: 136,743

[52] U.S. Cl..................................43/17.5, 43/43.1
[51] Int. Cl..............................................A01k 93/00
[58] Field of Search......................43/17.5, 17.6, 43.1

[56] References Cited

UNITED STATES PATENTS

| | | | |
|---|---|---|---|
| 2,022,193 | 11/1935 | Gaede | 43/17 |
| 2,431,420 | 11/1947 | Pope, Sr. | 43/17.5 |
| 2,603,904 | 7/1952 | Phillips | 43/43.1 |
| 3,041,771 | 7/1962 | Hreno | 43/17.5 |
| 3,292,294 | 12/1966 | Beach et al. | 43/17.5 |

*Primary Examiner*—Samuel Koren
*Assistant Examiner*—Daniel J. Leach
*Attorney*—Bradley and Wharton

[57] ABSTRACT

A fishing bobber having a source of illumination to accommodate night fishing. A first source of illumination is disposed in the bobber, a part of which is translucent, to make the bobber visible in the water at night. An elongated projection extends from the bobber into the water and houses a second source of illumination which is directed downwardly onto the baited hook. The lower half of the bobber is substantially opaque so as not to be visible to a fish in the water beneath the bobber. The fishing line which is attached to the bobber includes a leader section which extends directly beneath the bobber and is secured to the end of the aforementioned projection. The main length of line which is secured to the fishing pole is attached to the bobber by an elongated structure at the top of the bobber, in the same vertical plane as the projection which mounts the leader section.

A plurality of flotation balls or fins may be provided around the bobber to help stabilize it in the water.

7 Claims, 4 Drawing Figures

PATENTED SEP 26 1972 3,693,278
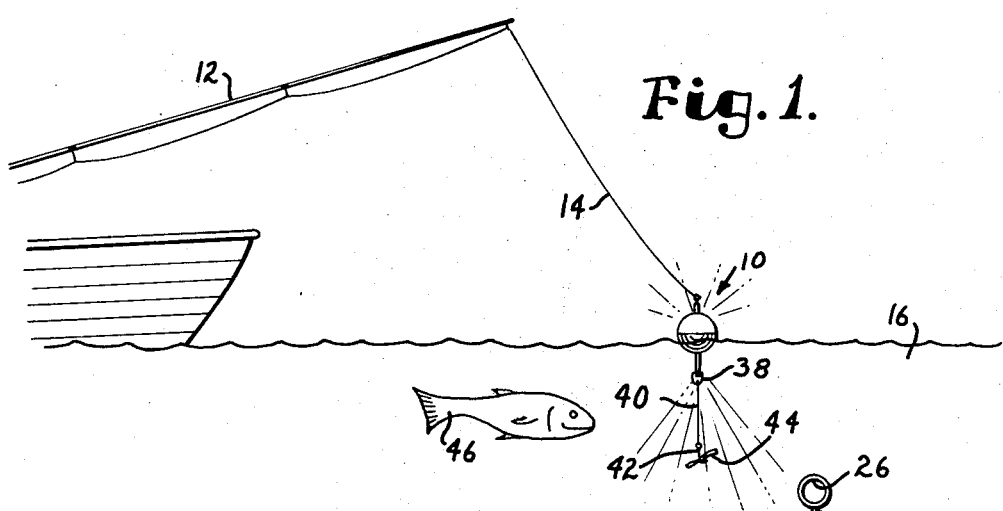
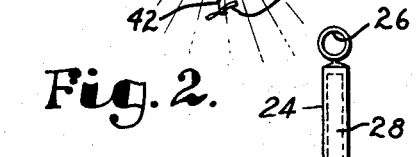
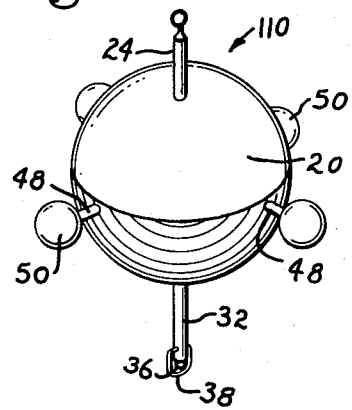
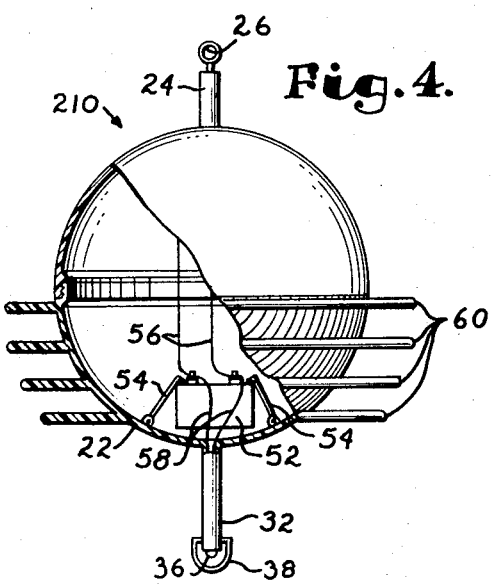
INVENTOR.
Asie Mahone, Jr.
BY Bradley and Wharton
ATTORNEYS

ILLUMINATED FISHING BOBBER

This invention relates to fishing apparatus and, more particularly, to a fishing bobber which is provided with a source of illumination.

Previous attempts to provide illuminated fishing bobbers to accommodate night fishing have been directed to illuminating the bobber alone. Such bobbers have not achieved wide acceptance largely because they have not been found to increase appreciably the chances of catching a fish. This lack of success is thought to be attributable to two reasons. First of all, the illuminated bobber at the surface of the water may startle some fish and cause them to move away from the baited hook. Secondly, the hook itself is in no way illuminated thus making it difficult or impossible for the fish to see the bait in the dark water. It is known that a source of light disposed beneath the surface of the water can be effective in attracting fish.

It is therefore an object of the present invention to provide an illuminated fishing bobber which is substantially opaque in the area submerged in the water to thereby prevent fish in the water from being scared away by the illumination above the water.

Another important object of the present invention is to provide a fishing bobber which illuminates an area beneath the surface of the water to attract fish to a baited hook.

Still another important aim of this invention is a fishing bobber having a source of illumination directly beneath the surface of the water to light the bait which is on the hook.

It is also one of the objectives of this invention to provide a fishing bobber as described in the foregoing objects which allows a fisherman to fish after dark with as great success as is normally enjoyed in daylight hours.

In the drawing:

FIG. 1 is a side elevational view of the bobber of the present invention disposed in a body of water;

FIG. 2 is a greatly enlarged side elevational view of the fishing bobber of the invention shown partially in cross section;

FIG. 3 is a perspective view on a reduced scale of an alternative form of the invention; and FIG. 4 is a side elevational view, similar to FIG. 2 but on a reduced scale, of still another alternative form of the invention.

Referring initially to the embodiment of FIGS. 1 and 2, the fishing bobber of the invention is designated generally by the numeral 10 and is adapted to be used with a fishing pole 12 and a fishing line 14 in a body of water 16. The bobber 10 comprises a generally spherical floatable body 18 formed from a pair of complemental hollow hemispheres 20 and 22. The upper hemisphere 20 is constructed of a translucent material and the lower hemisphere 22 is preferably constructed from a relatively opaque material.

Thus, as indicated in FIG. 2, the upper hemisphere can be white while the lower hemisphere is red.

Integral with the upper hemisphere 20 is an upright mast structure 24 having an eyelet 26 at its uppermost end for securing the line 14 to the bobber 10. The structure 24 also provides a housing for a battery 28 and a bulb 30 which provide a source of light that illuminates the body 18. Because of the translucent nature of the hemisphere 20 light can pass through the latter to make the bobber 10 visible to a fisherman holding the pole 12 but the relatively opaque nature of the hemisphere 22 substantially precludes the passage of light from the bulb 30 beneath the surface of the water 16. It is to be understood, of course, that the two hemispheres 20 and 22 will normally be sealingly joined together in a manner which will permit their disengagement to replace either the bulb 30 or the battery 28.

Included as an integral part of the lower hemisphere 22 is an elongated projection 32 which extends downwardly beneath the lower hemisphere. The projection 32 houses a battery 34 and a bulb 36 which provide a second source of light for illuminating an area of the water 16 beneath the surface, as best illustrated in FIG. 1. A U-shaped bracket 38 is disposed in protecting relationship to the bulb 36 and also serves to mount a section of leader line 40 having a fishing hook 42 secured thereto. A source of bait 44 is disposed on the hook 42 for attracting a fish 46 in the water 16.

When the bobber 10 is used for night fishing, the bulbs 30 and 36 are inserted to illuminate the bobber and an area of the water 16. The hook 42 is baited and the entire assembly is placed in the water as illustrated in FIG. 1. Because of the bulb 30, the upper hemisphere 20 is illuminated sufficiently to make it visible to a fisherman holding the pole 12. Because of the relatively opaque nature of the hemisphere 22, the fish 46 does not see the illuminated portion of the bobber 10 above the surface of the water 16 and is therefore not scared away from the area. The projection 32 should be sufficiently long to place the bulb 36 well beneath the surface of the water 16. Thus, the area illuminated by the bulb 36 is beneath the surface of the water and will serve to attract a fish 46. The line 40 should be short enough to keep the baited hook 42 within the area of illumination provided by the bulb 36. This makes the bait 44 readily visible for the fish 46. The light from the bulb 36 while serving to attract the fish 46 and illuminate the bait 44 also further masks the lighted portion of the bobber 10 above the surface by the light rays which are directed downwardly from this bulb.

It is also to be noted that the structure 24 and the projection 32 are in the same vertical plane. This results in the points of attachment of the lines 14 and 40 being in the same vertical plane and results in a highly stable condition when the bobber 10 is in the water 16. This is attributable to the fact that there are no torsional forces acting on the bobber and the hook 42 and bait 44 serve to anchor the bobber 10 and prevent its rotation.

An alternative form of the invention is illustrated in FIG. 3 and designated generally by the numeral 110. The bobber 110 is generally similar in construction to the bobber 10 above described except for the addition of a plurality of laterally extending arms 48 which project in a horizontal plane in circumferentially spaced relationship around the lower hemisphere 22. Each of the arms 48 mounts a spherical flotation ball 50. The balls 50 serve to provide additional stabilization to the bobber 110 and prevent it from turning too far in either direction under the influence of high winds or moving water.

Another modified form of the invention is illustrated in FIG. 4 and designated generally by the numeral 210. Again, the bobber 210 is comprised of a hemisphere 20 and 22 and includes mast structure 24 and the elongated projection 32. In this modified form of the invention, however, a single battery 52 is provided for the two light sources which illuminate the upper hemisphere 20 and the area beneath the bobber respectively. The battery 52 is held in place against the inner surface of the lower hemisphere 22 by a pair of clamps 54. Appropriate lead lines 56 and 58 convey energy from the battery 52 to the respective light bulbs (not shown).

Additionally, a plurality of vertically spaced circumscribing stabilizing fins 60 of generally planar configuration are formed as an integral part of the lower hemisphere 22. The fins 60 further stabilize the bobber 210 when it is disposed in a body of water such as 16 and prevent forces acting on the bobber from tipping it in any direction.

Having thus described the invention, what is claimed as new and desired to be secured by Letters Patent is:

1. A fishing bobber for use with a fishing line and hook, said bobber comprising:
    a body adapted to float in water,
    said body allowing the passage of light therethrough;
    a first source of light disposed in said body for illuminating the latter;
    a second source of light disposed in said body and directed to illuminate an area of the water beneath said body; and
    means for securing said fishing line and hook beneath said body within the area of illumination.

2. The invention of claim 1, said body including an elongated projection extending downwardly into the water, and wherein said second light source is housed in said projection, whereby the area of illumination is removed from the surface of the water.

3. The invention of claim 2, wherein said body is comprised of a pair of hemispheres sealingly joined one on top of the other to present the floatable body, the lower hemisphere being substantially opaque to preclude the passage of light therethrough and the upper hemisphere substantially translucent to accommodate the passage of light therethrough, said second light source projecting from said lower hemisphere.

4. The invention of claim 3, wherein each of said light sources comprises a bulb and a battery, and wherein said securing means comprises a U-shaped bracket disposed in protecting relationship to the bulb of said second source.

5. The invention of claim 4, wherein said body includes structure at the top of said upper hemisphere for securing said line above the body.

6. The invention of claim 1, wherein said body comprises a sphere, and including a plurality of flotation balls disposed around the sphere in a common horizontal plane which bisects the sphere.

7. The invention of claim 1, wherein said body comprises a sphere, and including a plurality of vertically spaced circumscribing stabilizing fins disposed around said sphere.

* * * * *